(12) United States Patent
Yamada

(10) Patent No.: US 10,396,374 B2
(45) Date of Patent: Aug. 27, 2019

(54) FUEL CELL COOLING SYSTEM

(71) Applicant: DENSO CORPORATION, Kariya, Aichi-pref. (JP)

(72) Inventor: Takashi Yamada, Kariya (JP)

(73) Assignee: DENSO CORPORATION, Kariya (JP)

(*) Notice: Subject to any disclaimer, the term of this patent is extended or adjusted under 35 U.S.C. 154(b) by 74 days.

(21) Appl. No.: 15/810,759

(22) Filed: Nov. 13, 2017

(65) Prior Publication Data

US 2018/0183078 A1 Jun. 28, 2018

(30) Foreign Application Priority Data

Dec. 26, 2016 (JP) ................................. 2016-251785

(51) Int. Cl.
| | |
|---|---|
| H01M 8/0432 | (2016.01) |
| H01M 8/04746 | (2016.01) |
| H01M 8/04664 | (2016.01) |
| H01M 8/04014 | (2016.01) |
| H01M 8/04276 | (2016.01) |
| H01M 8/04298 | (2016.01) |
| H01M 8/04828 | (2016.01) |

(52) U.S. Cl.
CPC ... *H01M 8/04276* (2013.01); *H01M 8/04014* (2013.01); *H01M 8/0432* (2013.01); *H01M 8/0435* (2013.01); *H01M 8/0494* (2013.01); *H01M 8/04298* (2013.01); *H01M 8/04358* (2013.01); *H01M 8/04664* (2013.01); *H01M 8/04768* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 6,492,043 B1 | 12/2002 | Knights et al. | |
| 2006/0251938 A1* | 11/2006 | Kamihara | H01M 8/04029 429/431 |
| 2017/0229721 A1* | 8/2017 | Baika | H01M 8/04014 |
| 2019/0088962 A1* | 3/2019 | Chikugo | H01M 8/04111 |

FOREIGN PATENT DOCUMENTS

| | | |
|---|---|---|
| JP | 2002-164070 | 6/2002 |
| JP | 2006-107990 | 4/2006 |
| JP | 2010-287362 | 12/2010 |

\* cited by examiner

*Primary Examiner* — Jonathan Crepeau
(74) *Attorney, Agent, or Firm* — Nixon & Vanderhye P.C.

(57) ABSTRACT

A fuel cell cooling system includes an air temperature estimating unit, an air temperature sensor and an abnormality determining unit. The air temperature sensor senses an air detection temperature of the air that flows out of the air cooler and is supplied to the fuel cell. The air temperature estimating unit estimates an air estimation temperature of the air, based on a temperature of a refrigerant flowing into the air cooler, a power supply quantity of a power supplied to the circulation pump, a temperature of the air flowing into the air cooler and a flow volume of the air. The abnormality determining unit determines that a circulation flow volume of the refrigerant is in an abnormal state when the air detection temperature is higher than the air estimation temperature by a value greater than or equal to a predetermined value.

5 Claims, 7 Drawing Sheets

FUEL CELL COOLING SYSTEM

CROSS REFERENCE TO RELATED APPLICATION

This application is based on Japanese Patent Application No. 2016-251785 filed on Dec. 26, 2016, the disclosure of which is incorporated herein by reference.

TECHNICAL FIELD

The present disclosure relates to a fuel cell cooling system which cools down a fuel cell.

BACKGROUND

Since a fuel cell executing a power generation by a chemical reaction between a hydrogen gas and an air generates heat when executes the power generation, it is necessary that a cooling system circulates a refrigerant such as a coolant to the fuel cell to suppress an increasing of a temperature of the fuel cell.

In the above cooling system, the coolant may be leaked from a circulation passage of the coolant due to a damage of a pipe constituting the circulation passage, the fuel cell may be activated in a state where the increasing of the temperature of the fuel cell cannot be sufficiently suppressed, and the fuel cell may be deteriorated.

According to JP2002-164070A, in a cooling system, a liquid collecting unit is located on a bottom surface of a casing that receives a fuel cell. The cooling system senses a liquid level of the coolant stored in the liquid collecting unit and detects a leakage abnormality of the coolant.

SUMMARY

However, in the cooling system according to JP2002-164070A, since a sensor that senses the liquid level and the liquid collecting unit are necessary, a configuration of a leakage abnormality detection becomes complicated. Further, the cooling system can detect the leakage abnormality only in a case where a leakage occurs in the casing. In other words, when a leakage occurs in a circulation passage out of the casing, the coolant is not stored in the liquid collecting unit, and then the leakage abnormality cannot be detected.

It is an object of the present disclosure to provide a fuel cell cooling system which can execute an abnormality detection by a simple constitution without being limited to a leakage at a specified position.

According to an aspect of the present disclosure, the fuel cell cooling system circulates a refrigerant in a fuel cell, an air cooler and a radiator by a circulation pump, cools down the fuel cell by controlling the radiator to dissipate a heat transmitted from the fuel cell to the refrigerant and cools down an air supplied to the fuel cell by the air cooler.

The fuel cell cooling system includes an air temperature estimating unit configured to estimate an air estimation temperature that is a temperature of the air that flows out of the air cooler and is supplied to the fuel cell, based on a temperature of a refrigerant flowing into the air cooler, a power supply quantity that is a quantity of a power supplied to the circulation pump, a temperature of the air flowing into the air cooler and a flow volume of the air, an air temperature sensor configured to sense an air detection temperature that is the temperature of the air that flows out of the air cooler and is supplied to the fuel cell, and an abnormality determining unit configured to determine that a circulation flow volume of the refrigerant is in an abnormal state where the circulation flow volume is smaller than a predetermined flow volume when the air detection temperature sensed by the air temperature sensor is higher than the air estimation temperature estimated by the air temperature estimating unit by a value greater than or equal to a predetermined value.

Since a flow volume of the refrigerant flowing into the air cooler increases in accordance with an increase in power supply quantity of the circulation pump, a level of cooling the air at the air cooler becomes higher, and the temperature of the air flowing out of the air cooler becomes lower. The temperature of the air flowing out of the air cooler varies according to the temperature of the refrigerant flowing into the air cooler, the temperature of the air flowing into the air cooler and the flow volume of the air flowing into the air cooler. Thus, the temperature of the air flowing out of the air cooler can be estimated based on the above parameters that are the power supply quantity, the temperature of the refrigerant flowing into the air cooler, the temperature of the air flowing into the air cooler and the flow volume of the air. When the refrigerant is leaked from a circulation passage or when a charging operation that charges the refrigerant to the circulation passage is not executed, the circulation flow volume of the refrigerant becomes remarkably small. In this case, the circulation flow volume cannot be ensured to match the power supply quantity supplied to the circulation pump, and the level of cooling the air at the air cooler is insufficient. Thus, the air detection temperature is higher than the air estimation temperature.

According to the present disclosure, the temperature of the air flowing out of the air cooler is estimated by the air temperature estimating unit and is sensed by the air temperature sensor. When the air detection temperature sensed by the air temperature sensor is higher than the air estimation temperature estimated by the air temperature estimating unit by a value greater than or equal to the predetermined value, the abnormality determining unit determines that the circulation flow volume of the refrigerant is in the abnormal state where the circulation flow volume is smaller than the predetermined flow volume. Thus, a liquid collecting unit and a liquid level sensor that are necessary in a cooling system according to JP2002-164070A are unnecessary, and the abnormal state where the circulation flow volume becomes smaller due to the coolant leakage can be detected. Since the abnormal state can be detected when the leakage occurs at a part of the circulation passage, an abnormality detection can be achieved by a simple constitution without being limited to a leakage at a specified position.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
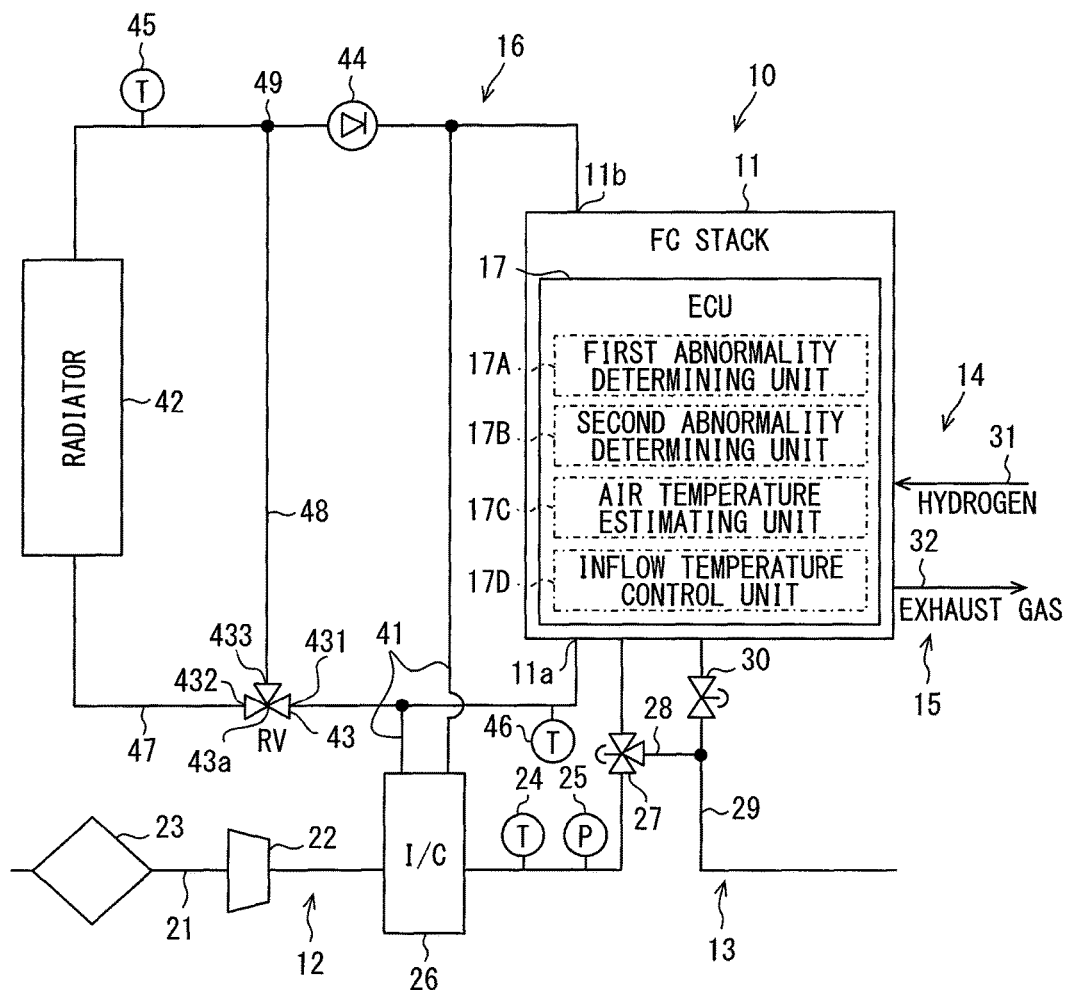
FIG. 1 is a diagram showing a fuel cell cooling system according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration in each embodiment is changed, the other parts of the configuration can be configured as the same as a prior embodiment. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

(First Embodiment)

Referring to FIGS. 1 to 8, a first embodiment of the present disclosure will be described. A fuel cell system 10 is mounted to a fuel cell hybrid vehicle (FCHV) and supplies a power to a travelling motor.

As shown in FIG. 1, the fuel cell system 10 includes a fuel cell that is a FC stack 11, a cathode-gas supplying unit 12, a cathode-gas discharging unit 13, an anode-gas supplying unit 14, an anode-gas discharging unit 15 and a fuel cell cooling system. The cathode-gas supplying unit 12 supplies an air that is equivalent to a cathode gas to the fuel cell. The anode-gas supplying unit 14 supplies a hydrogen that is equivalent to an anode gas to the fuel cell. The fuel cell is a solid polymer fuel cell that generates a power by using an electrochemical reaction between the hydrogen and an oxygen that are supplied. The fuel cell that is the FC stack 11 includes cells having a structure that an electrolyte film is interposed between a plate of a cathode electrode and a plate of an anode electrode, and separators located between the cells.

The electrolyte film includes a solid polymer thin film having a good proton conductivity and a dryness level in a wet state. In the wet state, the electrolyte film has the good proton conductivity, and the FC stack 11 operates in a normal state without being disturbed. The electrodes are made of carbon. A platinum catalyst advancing a power generating reaction is supported at a boundary between the electrodes and the electrolyte film. The hydrogen that is equivalent to a reaction gas is supplied to power generating region of the cells through gas passages arranged in the cells.

The FC stack 11 includes an ECU 17 that is equivalent to an electronic control unit controlling the fuel cell. The ECU 17 is a control unit controlling components of the fuel cell system 10. The ECU 17 executes a program stored in a storage media to control the components. The ECU 17 includes at least one central processing unit (CPU) and the storage media storing the program and a data. According to the present embodiment, the ECU 17 is achieved by a microcomputer including a storage media that is readable by a computer. The storage media is a non-transitional substantial storage media that temporarily stores the program and the data that are readable by the computer. According to the present embodiment, the storage media is achieved by a semiconductor memory or a magnetic disc.

The cathode-gas supplying unit 12 includes a cathode-gas pipe 21, an air compressor 22, an air flowmeter 23, an air temperature sensor 24, a pressure measuring unit 25, an intercooler (I/C) 26 and a three-way valve 27. The cathode-gas pipe 21 is a pipe connected with a cathode electrode terminal of the FC stack 11. The cathode electrode terminal is connected with the cathode electrodes of the cells. The air compressor 22 is a compressor connected with the FC stack 11 through the cathode-gas pipe 21, introduces and compresses an external air to into the air, and supplies the air to the FC stack 11 as the cathode gas.

The air flowmeter 23 is located upstream of the air compressor 22, measures a quantity of the external air introduced into the air compressor 22, and sends a measured value of the quantity to the ECU 17. The ECU 17 drives the air compressor 22 based on the measured value so as to control a supplying quantity that is a quantity of the air supplied to the FC stack 11.

The intercooler 26 is an air cooler including a heat exchanger that exchanges heat between a refrigerant flowing through a cooling circuit 16 and the air flowing in the cathode-gas pipe 21 at a position downstream of the air compressor 22 and cools down the air supplied to the FC stack 11. The pressure measuring unit 25 and the air temperature sensor 24 are located downstream of the intercooler 26. The pressure measuring unit 25 measures a pressure of the cathode gas and sends a measured value of the pressure to the ECU 17. The air temperature sensor 24 senses a temperature of the cathode gas and sends a measured value of the temperature to the ECU 17.

The three-way valve 27 is located downstream of the pressure measuring unit 25 and the air temperature sensor 24. The three-way valve 27 is connected with a cathode exhaust-gas pipe 29 of the cathode-gas discharging unit 13 through a communication pipe 28. The three-way valve 27 normally communicates with an upstream part of the cathode-gas pipe 21 and a downstream part of the cathode-gas pipe 21 and supplies the air to the FC stack 11. When an abnormality of the fuel cell system 10 occurs, the three-way valve 27 does not supply the air to the FC stack 11, supplies the air to the communication pipe 28 to bypass the FC stack 11, and then introduces the air into the cathode exhaust-gas pipe 29.

The cathode-gas discharging unit 13 includes the cathode exhaust-gas pipe 29 and a pressure regulating valve 30. The cathode exhaust-gas pipe 29 is a pipe connected with the cathode electrode terminal of the FC stack 11 and discharges a cathode exhaust gas flowing through the FC stack 11 to an exterior of the fuel cell system 10. The pressure regulating valve 30 regulates a pressure of the cathode exhaust gas in the cathode exhaust-gas pipe 29. The ECU 17 controls an opening level of the pressure regulating valve 30 based on the measured value of the pressure measuring unit 25. The communication pipe 28 is connected with the cathode exhaust-gas pipe 29 downstream of the pressure regulating valve 30.

The anode-gas supplying unit 14 includes an anode-gas pipe 31 and a hydrogen tank that not shown. The hydrogen tank is connected with the FC stack 11 through the anode-gas pipe 31 and supplies the hydrogen filled in the hydrogen tank to the FC stack 11.

The anode-gas discharging unit 15 includes an anode exhaust-gas pipe 32 and a vapor-liquid separating unit that is not shown. The anode exhaust-gas pipe 32 is a pipe connected with an outlet of an anode electrode terminal of the FC stack 11 and the vapor-liquid separating unit and introduces an anode exhaust gas including non-reaction gas into the vapor-liquid separating unit. The anode electrode terminal is connected with the anode electrodes of the cells, and the non-reaction gas is a gas that is not used in the power generating reaction and includes the hydrogen and the oxygen. The vapor-liquid separating unit separates a vapor component and a liquid component included in the anode exhaust gas. The vapor-liquid separating unit introduces the vapor component into the anode-gas supplying unit 14 and discharges the liquid component to external.

As shown in FIG. 1, the fuel cell hybrid vehicle includes the cooling circuit 16 that is equivalent to a cooling unit that cools down the FC stack 11. The cooling circuit 16 is a refrigerant circuit circulating a coolant that is the refrigerant outside of the FC stack 11 such that the coolant flows out of the FC stack 11 and then flows back into the FC stack 11. The cooling circuit 16 is connected with a coolant outlet 11a of the FC stack 11 and a coolant inlet 11b. The cooling circuit 16 includes connection passages 41 connected with the intercooler 26 located in a pipe through which the air supplied to the FC stack 11 flows, and the cooling circuit 16 also functions as a cooling unit that cools down a supplied air.

The cooling circuit 16 further includes a radiator 42, a rotary valve 43 and a circulation pump 44 in addition of the intercooler 26. The cooling circuit 16 further includes a radiator outlet temperature sensor 45 as a first temperature sensor and a cell outlet temperature sensor 46 as a second temperature sensor. The radiator outlet temperature sensor 45 and the cell outlet temperature sensor 46 send sensed temperature information to the ECU 17. The fuel cell cooling system includes the rotary valve 43, the cell outlet temperature sensor 46 and the ECU 17.

The radiator outlet temperature sensor 45 is located in the cooling circuit 16 downstream of the radiator 42 and is located in the cooling circuit 16 upstream of the circulation pump 44 and a bypass passage 48. Thus, the radiator outlet temperature sensor 45 senses a temperature of the coolant right after the coolant is cooled down by the radiator 42 as a radiator outlet temperature ToutR.

The cell outlet temperature sensor 46 is located in the cooling circuit 16 downstream of the FC stack 11 and is located in the cooling circuit 16 upstream of the rotary valve 43 and the intercooler 26. Thus, the cell outlet temperature sensor 46 senses the temperature of the coolant right after the coolant is heated by the FC stack 11 as a cell outlet temperature Tout.

The FC stack 11 provides the power that is necessary in a travelling of the fuel cell hybrid vehicle. When the FC stack 11 generates the power, a heat quantity that is a quantity of a heat generated by the FC stack 11 is in a level the same as an internal combustion engine generates. Thus, the radiator 42 is arranged so as to cool down the FC stack 11. The radiator 42 is located in the cooling circuit 16 and is a heat discharger that discharges heat to external by exchanging heat between the coolant and the external air. The radiator 42 is a heat discharging exchanger that cools down the coolant heated by the FC stack 11. The radiator 42 is arranged in a front region of an engine room. The radiator 42 includes a blower fan that is not shown. The radiator 42 cools down the coolant by using a cooling air that is supplied by the blower fan.

The cooling circuit 16 further includes a heat discharging passage 47 through which the coolant flows to the radiator 42 and the bypass passage 48 through which the coolant flows by bypassing the radiator 42. The bypass passage 48 branches from the cooling circuit 16 at a branch point 43a that is located upstream of the radiator 42 in a coolant flow and joins the cooling circuit 16 at a junction point 49 that is located downstream of the radiator 42 in the coolant flow.

The rotary valve 43 is located at the branch point 43a in the cooling circuit 16 where the heat discharging passage 47 and the bypass passage 48 separate from each other, and the rotary valve 43 regulates dividing ratios of the coolant circulated by the circulation pump 44 and flowing through the heat discharging passage 47 and the bypass passage 48. A flow volume of the coolant flowing through the heat discharging passage 47 is referred to as a heat-dissipation flow volume, and a flow volume of the coolant flowing through the bypass passage 48 is referred to as a bypass flow volume. In other words, a total volume of the heat-dissipation flow volume and the bypass flow volume is a circulation flow volume of the circulation pump 44 and is an inflow volume that is a volume of the coolant flowing into the FC stack 11. The rotary valve 43 is equivalent to a flow-volume ratio regulating valve that regulates a flow-volume ratio between the heat-dissipation flow volume and the bypass flow volume.

The rotary valve 43 has a structure that a valve is rotatably received in a casing. The casing includes an inlet 431 through which the coolant flowing through the cell outlet temperature sensor 46 flows, a heat-dissipation outlet 432 that discharges the coolant to the heat-dissipation passage 47 and a bypass outlet 433 that discharges the coolant to the bypass passage 48.

The valve rotates in the casing to adjust a heat-dissipation opening level that is an opening level of a communication between the inlet 431 and the heat-dissipation outlet 432 and to adjust a bypass opening level that is an opening level of a communication between the inlet 431 and the bypass outlet 433. The rotary valve 43 is a three-way valve where the heat-dissipation opening level and the bypass opening level vary in association with each other. The ECU 17 controls a rotation position of the valve to adjust the flow-volume ratio between the heat-dissipation flow volume and the bypass flow volume.

Specifically, when the valve is rotated to a position that the heat-dissipation opening level is 100%, the bypass opening level becomes 0%. Thus, the heat-dissipation opening level is in a fully open state and the bypass opening level is in a fully closed state. When the valve is rotated to a position that the heat-dissipation opening level is 0%, the bypass opening level becomes 100%. Thus, the heat-dissipation opening level is in the fully closed state and the bypass opening level is in the fully open state. When the valve is rotated to a position that the heat-dissipation opening level is 50%, the bypass opening level becomes 50%. Thus, the heat-dissipation opening level is in a half opening state and the bypass opening level is in the half opening state. According to the present embodiment, the heat-dissipation opening level is referred to as a valve opening level.

The circulation pump 44 is located in the cooling circuit 16 downstream of the junction point 49 and located upstream of the FC stack 11 in the coolant flow. The circulation pump 44 is a pump that feeds and circulates the coolant in the cooling circuit 16. The circulation pump 44 may be a rotation type pump that an impeller is rotated in a pump housing to feed the coolant.

The ECU 17 controls supplying quantities of the hydrogen and the air that are supplied to the FC stack 11 to control a power generation quantity of the FC stack 11. Further, it is requested that a temperature of a cell included in the FC stack 11 is controlled to be in an optimal range that is predetermined so as to improve a power generation efficiency of the FC stack 11 and suppress a deterioration of the FC stack 11. Since the ECU 17 controls operations of the rotary valve 43 and the circulation pump 44, the ECU 17 controls a heat dissipation quantity of heat dissipated from the FC stack 11 to the coolant and controls the temperature of the cell of the FC stack 11 to be in the optimal range.

Specifically, since the ECU 17 controls an operation of the rotary valve 43, the ECU 17 adjusts the flow-volume ratio between the heat-dissipation flow volume and the bypass flow volume and executes a temperature regulation to adjust a cell inlet temperature Tin that is a temperature of the coolant flowing into the FC stack 11. Since the ECU 17 executes the temperature regulation, the ECU 17 controls the cell outlet temperature Tout to approach a target outlet temperature Ttrg. Since the cell outlet temperature Tout and a cell temperature that is the temperature of the cell of the FC stack 11 have a correlation that is high, the ECU 17 sets the target outlet temperature Ttrg of the cell outlet temperature Tout to a temperature where the cell temperature is in the optimal range, based on the correlation.

Further, since the ECU 17 controls an operation of the circulation pump 44, the ECU 17 executes a flow-volume regulation to adjust the circulation flow volume that is the flow volume of the coolant flowing into the FC stack 11. Since the ECU 17 executes the flow-volume regulation, the ECU 17 controls the dryness level of the electrolyte film to be in an optimal range. Then, the ECU 17 executes the temperature regulation to adjust the cell inlet temperature Tin according to the circulation flow volume that is adjusted. The central processing unit included in the ECU 17 controls the rotary valve 43 and adjusts the cell inlet temperature Tin. In this case, the central processing unit is equivalent to an inflow temperature control unit 17D shown in FIG. 1.

When the coolant is leaked from the cooling circuit 16 due to a damage of the pipe constituting the cooling circuit 16 or when the coolant is not supplied to the cooling circuit 16 at a manufacturing phase or a maintenance phase of the fuel cell hybrid vehicle, the FC stack 11 is insufficiently cooled. In this case, the central processing unit included in the ECU 17 determines whether the circulation flow volume of the coolant is in an abnormal state where the circulation flow volume is smaller than a predetermined flow volume. In this case, the central processing unit is equivalent to a first abnormality determining unit 17A and a second abnormality determining unit 17B shown in FIG. 1.

When the abnormality determining units detect the abnormal state, the ECU 17 limits the power generation quantity of the FC stack 11 or a power supply quantity that is a quantity of the power supplied to the travelling motor so as to control the FC stack 11 in a fail safe mode where an increasing of the cell temperature is suppressed and the fuel cell hybrid vehicle travels. According to the present embodiment, when the abnormality determining units determine that the circulation flow volume is in the abnormal state, the abnormality determining units detect the abnormal state. When the first abnormality determining unit 17A does not detect the abnormal state, the ECU 17 controls the FC stack 11 in a normal travelling mode where the power generation quantity of the FC stack 11 is equal to a request value and the fuel cell hybrid vehicle travels.

Referring to FIGS. 2 to 5, operations of the first abnormality determining unit 17A, the second abnormality determining unit 17B, an air temperature estimating unit 17C and the inflow temperature control unit 17D. The central processing unit of the ECU 17 executes a control shown in FIG. 4 in a time period where a power generation of the FC stack 11 is requested.

Figure 2:
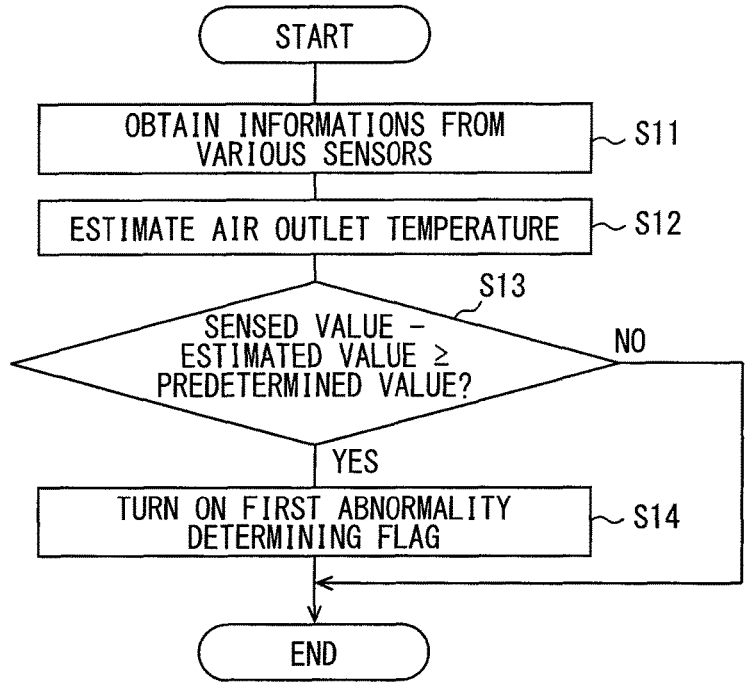
FIG. 2 is a flowchart showing a first abnormality determining operation executed by an ECU shown in FIG. 1.

FIG. 2 is a flowchart showing a first abnormality determining operation executed by the first abnormality determining unit 17A. At S11, the central processing unit obtains informations from various sensors and then proceeds to S12. According to the present embodiment, the cell outlet temperature Tout that is sensed by the cell outlet temperature sensor 46 or the radiator outlet temperature ToutR that is sensed by the radiator outlet temperature sensor 45 may be inputted to the central processing unit as the informations. Further, an air temperature sensed by the air temperature sensor 24, the pressure measured by the pressure measuring unit 25, or the circulation flow volume of the coolant may be inputted to the central processing unit as the informations. Furthermore, an outside air temperature sensed by an outside air temperature sensor that is not shown, a current value of the FC stack 11 sensed by a current sensing circuit that is not shown, or a voltage value of the FC stack 11 sensed by a voltage sensing circuit that is not shown may be inputted to the central processing unit as the informations.

At S12, the central processing unit estimates an air outlet temperature that is a temperature of the air that flows out of the intercooler 26 and is supplied to the FC stack 11, based on values in the informations obtained at S11. Specifically, the values include plural air parameters indicating a state of the air flowing into the intercooler 26 and plural coolant parameters indicating a state of the coolant flowing into the intercooler 26. Thus, the central processing unit calculates an estimation value of the air outlet temperature as an air estimation temperature. The central processing unit executing S12 is equivalent to the air temperature estimating unit 17C.

The air parameters include an air inlet temperature that is the temperature of the air flowing into the intercooler 26, a flow volume of the air and a pressure of the air. The pressure of the air may be the pressure of the air upstream of the intercooler 26 or the pressure of the air downstream of the intercooler 26. The air inlet temperature may be sensed by a temperature sensor that is not shown and is mounted to the air flowmeter 23. An air flow volume that is the flow volume of the air and an air pressure that is the pressure of the air may be sensed by the air flowmeter 23 and the pressure measuring unit 25.

The coolant parameters include a refrigerant inlet temperature that is a temperature of the refrigerant flowing into the intercooler 26 and a power supply quantity that is a quantity of the power supplied to the circulation pump 44. The power supply quantity may be calculated based on detected values of a current flowing through a motor of the circulation pump 44 and a voltage applied to the motor. Alternatively, the power supply quantity may be estimated based on an instruction value outputted from the ECU 17.

Figure 3:
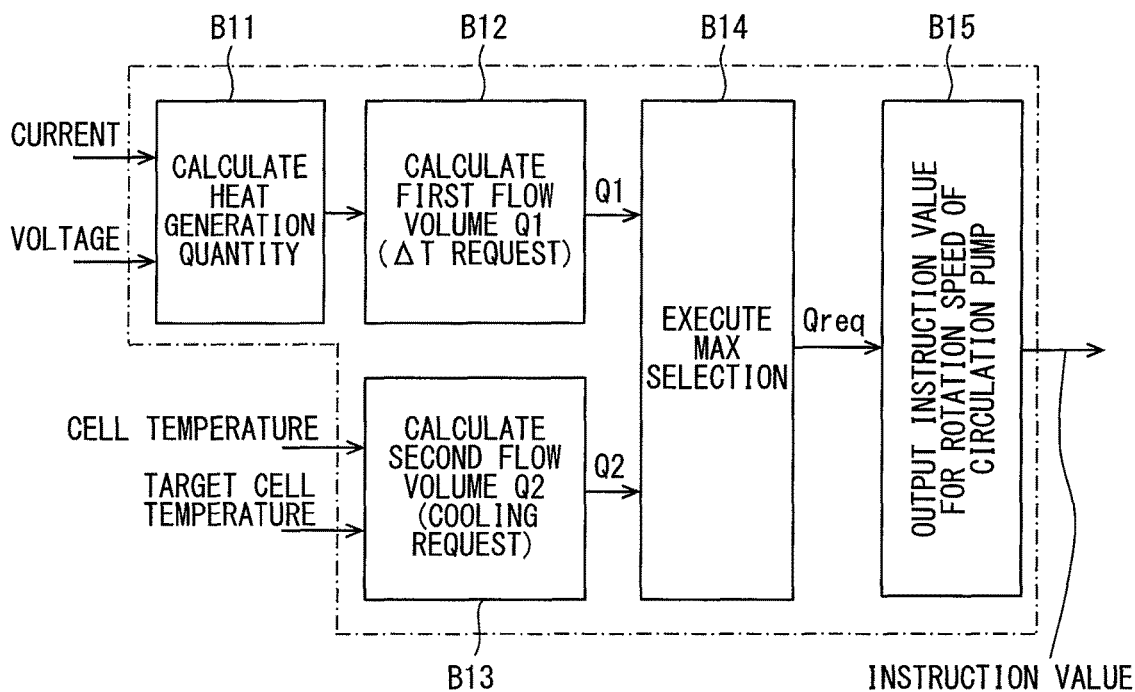
FIG. 3 is a block diagram showing an instruction value calculation of a circulation pump rotation speed.

A first function block B11 shown in FIG. 3 calculates the heat quantity that is the quantity of the heat generated when the FC stack 11 generates the power. Specifically, the first function block B11 detects a current value and a voltage value of the power generated by the FC stack 11, and then calculates a heat generation quantity Q based on the detected values that are the current value and the voltage value. According to the present embodiment, the heat generation quantity is equivalent to the heat quantity. A second function block B12 calculates a first flow volume Q1 of the circulation pump 44 in response to the heat generation quantity Q. According to the present embodiment, the circulation pump 44 is referred to as WP. The first flow volume Q1 is flow volume that is necessary to prevent a temperature increasing of the FC stack 11 due to the heat generation quantity Q.

A third function block B13 calculates a second flow volume Q2 of the circulation pump 44 in response to a difference between the cell temperature of the FC stack 11 and a target cell temperature. Since the cell outlet temperature Tout of the coolant and the cell temperature have the correlation that is high, the third function block B13 may calculate the second flow volume Q2 based on a difference between the cell outlet temperature Tout sensed by the cell outlet temperature sensor 46 and a target temperature of the cell outlet temperature Tout. The second flow volume Q2 is a flow volume requested to decrease the cell temperature to the target cell temperature.

A fourth function block B14 executes a max selection to select the larger one of the first flow volume Q1 and the second flow volume Q2 as a requested flow volume. A fifth function block B15 outputs an instruction value for a rotation speed of the circulation pump 44 according to the requested flow volume or outputs an instruction value for the power supply quantity of the circulation pump 44 according to the rotation speed. Specifically, when a voltage applied to the motor of the circulation pump 44 is duty controlled, the fifth function block B15 outputs an instruction value of a duty ratio.

At S13, the central processing unit loads an air detection temperature that is a sensed value of the air outlet temperature sensed by the air temperature sensor 24. Then, the central processing unit determines whether a deviation obtained by subtracting an estimated value that is the air estimation temperature calculated at S12 from the air detection temperature is greater than or equal to a predetermined value. In other words, the central processing unit determines whether the air detection temperature is higher than the air estimation temperature by a value greater than or equal to the predetermined value.

When the central processing unit determines that the air detection temperature is higher than the air estimation temperature by a value greater than or equal to the predetermined value at S13, the central processing unit proceeds to S14. At S14, the central processing unit determines that the circulation flow volume is in the abnormal state and turns on a first abnormality determining flag. When the central processing unit determines that the air detection temperature is not higher than the air estimation temperature by a value greater than or equal to the predetermine value at S13, the central processing unit terminates the first abnormality determining operation shown in FIG. 2 without turning on the first abnormality determining flag.

Figure 4:
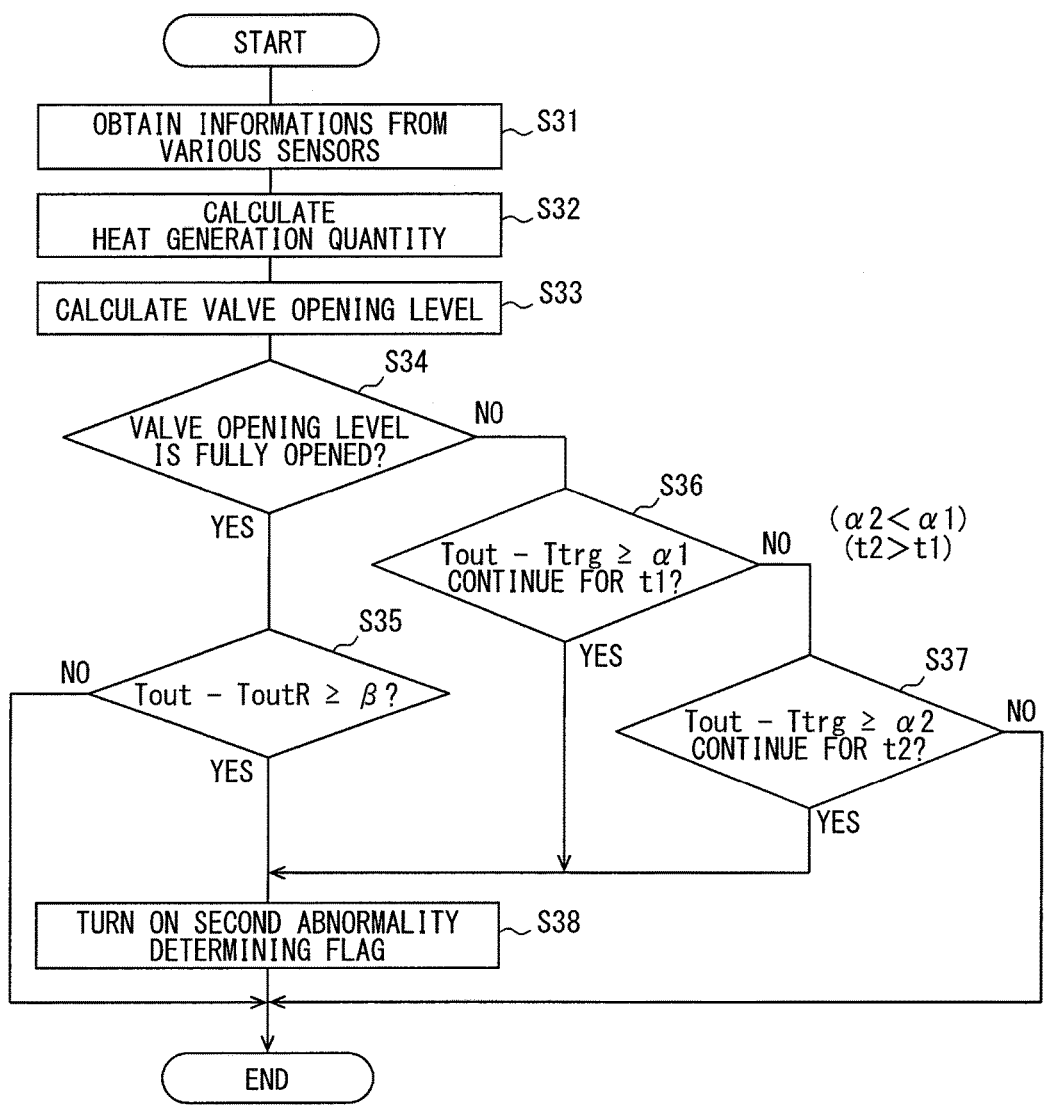
FIG. 4 is a flowchart showing a second abnormality determining operation executed by the ECU shown in FIG. 1.

FIG. 4 is a flowchart showing a second abnormality determining operation executed by the second abnormality determining unit 17B. At S31, the central processing unit obtains informations from various sensors and proceeds to S32. According to the present embodiment, the cell outlet temperature Tout that is sensed by the cell outlet temperature sensor 46 or the radiator outlet temperature ToutR that is sensed by the radiator outlet temperature sensor 45 may be inputted to the central processing unit as the informations. Further, similar to S11, the outside air temperature, the current value of the FC stack 11 or the voltage value of the FC stack 11 may be inputted to the central processing unit as the informations.

At S32, the central processing unit calculates the heat quantity that is the quantity of the heat generated when the FC stack 11 generates the power. Specifically, the central processing unit detects a current value and a voltage value of the power generated by the FC stack 11, and then calculates a heat generation quantity based on the detected values that are the current value and the voltage value. According to the present embodiment, the heat generation quantity is equivalent to the heat quantity. At S33, the central processing unit calculates the valve opening level of the rotary valve 43 based on the heat generation quantity calculated at S32. The inflow temperature control unit 17D calculates the valve opening level and outputs an opening level instruction signal. The rotary valve 43 operates according to an opening level instruction of the opening level instruction signal to adjust the cell inlet temperature Tin. In other words, the cell inlet temperature Tin is adjusted by the operation of the rotary valve 43. The central processing unit executing a valve opening-level calculation operation at S12 and S13 which is equivalent to an operation executed by the inflow temperature control unit 17D.

Figure 5:
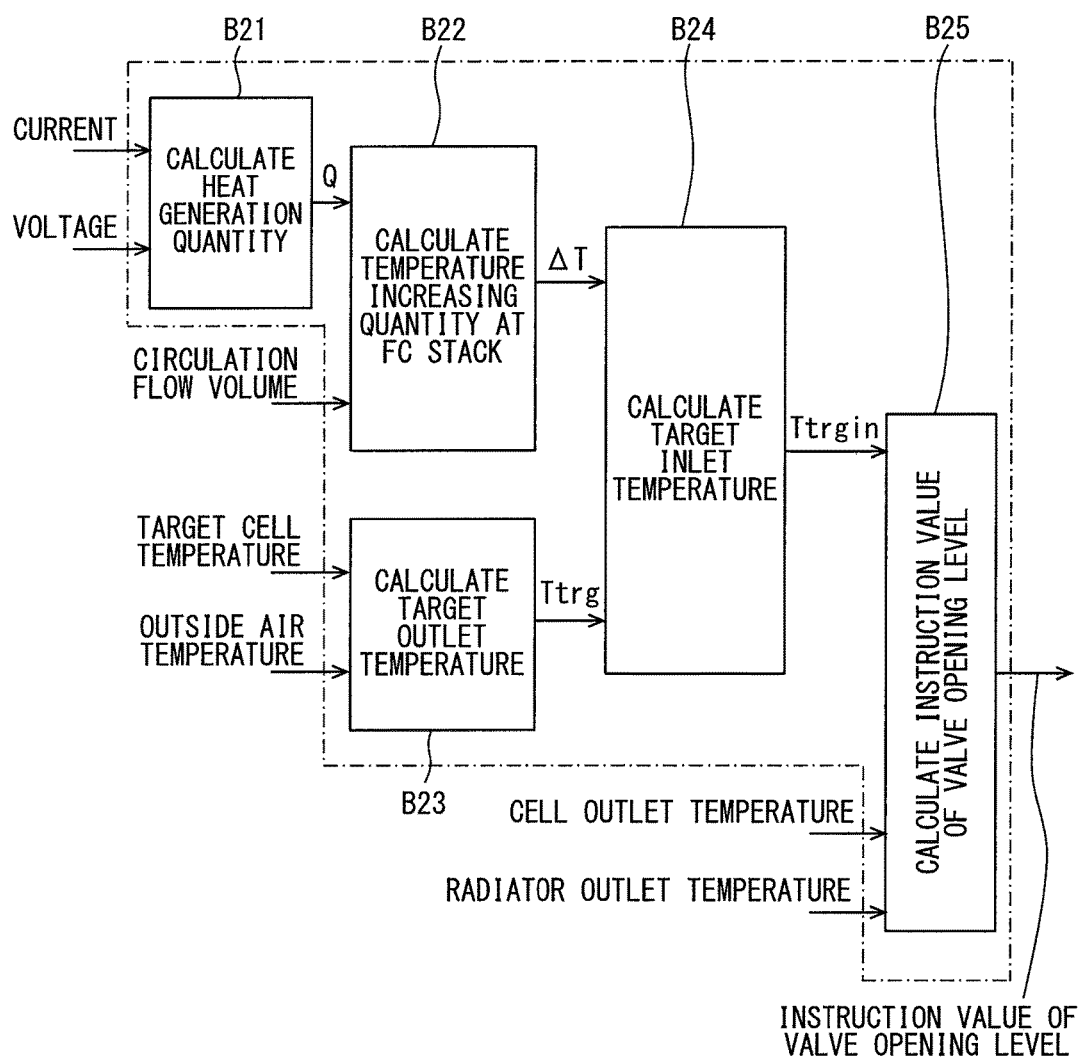
FIG. 5 is a block diagram showing a valve opening level calculation operation.

FIG. 5 is a block diagram showing a valve opening level calculation operation executed by the inflow temperature control unit 17D. Each function block of the inflow temperature control unit 17D will be described. A sixth function block B21 calculates the heat generation quantity Q of the FC stack 11 based on the current value and the voltage value as described at S32. Specifically, the first function block B1 calculates the heat generation quantity Q to be increased in accordance with an increase in current value or a decrease in voltage value.

A seventh function block B22 calculates a temperature increasing quantity $\Delta T$ at the FC stack 11 based on the heat generation quantity Q that is calculated and the circulation flow volume of the circulation pump 44. Specifically, the second function block B2 calculates the temperature increasing quantity $\Delta T$ to be increased in accordance with an increase in heat generation quantity Q, and the second function block B2 calculates the temperature increasing quantity $\Delta T$ to be decreased in accordance with an increase in circulation flow volume. According to the present embodiment, the circulation flow volume may be calculated based on a power quantity supplied to the circulation pump 44.

An eighth function block B23 calculates the target outlet temperature Ttrg of the cell outlet temperature Tout of the coolant based on the target cell temperature and the outside air temperature. The target cell temperature is set to a value that the cell temperature is in the optimal range. The outside air temperature is a value sensed by the outside air temperature sensor, and is equivalent to an ambient temperature of an exterior of a chassis receiving plural cells. The cell outlet temperature Tout and the cell temperature have the correlation that is high. The correlation varies according to the outside air temperature. The eighth function block B23 calculates the target outlet temperature Ttrg based on the target cell temperature, the outside air temperature and the correlation. Further, the third function block B3 corrects the target outlet temperature Ttrg according to the current value of the FC stack 11, a history of the cell temperature, a dry state and a vehicle speed.

A ninth function block B24 calculates a target inlet temperature Ttrgin of the cell inlet temperature Tin of the coolant based on the temperature increasing quantity $\Delta T$ calculated by the seventh function block B22 and the target outlet temperature Ttrg calculated by the eighth function block B23. Specifically, the fourth function block B4 calculates the target inlet temperature Ttrgin to be decreased in accordance with a decrease in target outlet temperature Ttrg, and the fourth function block B4 calculates the target inlet temperature Ttrgin to be decreased in accordance with an increase in temperature increasing quantity $\Delta T$.

A tenth function block B25 calculates an instruction value of the valve opening level based on the target inlet temperature Ttrgin calculated by the ninth function block B24, the cell outlet temperature Tout and the radiator outlet temperature ToutR. The cell outlet temperature Tout is a value sensed by the cell outlet temperature sensor 46, and the radiator outlet temperature ToutR is a value sensed by the radiator outlet temperature sensor 45. Further, the fifth function block B5 corrects the instruction value of the valve opening level according to a power consumption of vehicle electric devices, a temperature variation level of plural cells and the vehicle speed. The inflow temperature control unit 17D outputs the opening level instruction signal to control the rotary valve 43 to operate at the valve opening level calculated by the tenth function block B25.

According to the present embodiment, the inflow temperature control unit 17D calculates the instruction value of the valve opening level based on input values shown in FIG. 5. The input values include the current value and the voltage value of the FC stack 11, the circulation flow volume of the coolant, the target cell temperature, the outside air temperature, the cell outlet temperature Tout and the radiator outlet temperature ToutR.

At S34 shown in FIG. 4, the central processing unit determines whether the valve opening level calculated at S33 is fully opened after the instruction value of the valve opening level is calculated as shown in FIG. 5. In other words, the central processing unit determines whether heat-dissipation opening level is 100% after the instruction value of the valve opening level is calculated as shown in FIG. 5.

When the valve opening level is fully opened in a case where the heat generation quantity at the FC stack 11 is smaller than a heat dissipation quantity of the radiator 42, the cell temperature becomes lower than the target cell temperature. Thus, the valve opening level is adjusted to be in an opening level range where the valve opening level is not fully opened, and the cell inlet temperature Tin becomes higher than that of when the valve opening level is fully opened. When the valve opening level is fully opened in a case where the heat generation quantity at the FC stack 11 is larger than the heat dissipation quantity of the radiator 42, the cell temperature is still higher than the target cell temperature. Thus, the valve opening level is maintained to be fully opened. Thus, at S34, the central processing unit also determines whether the heat generation quantity is in a state where the heat generation quantity is smaller than the heat dissipation quantity and the cell inlet temperature Tin can be adjusted to a proper temperature. According to the present embodiment, a time period that the heat generation quantity is in a state where the cell inlet temperature Tin can be adjusted to the proper temperature and the valve opening level is not fully opened is referred to as an adjusting time period.

When the central processing unit determines that the valve opening level is fully opened at S34, the central processing unit determines that the cell inlet temperature Tin is in a state that the cell inlet temperature Tin cannot be adjusted to the proper temperature and proceeds to S35. At S35, the central processing unit determines whether the cell outlet temperature Tout is increased to be out of an estimated range. Specifically, the central processing unit calculates a first subtracting value by subtracting the radiator outlet temperature ToutR sensed by the radiator outlet temperature sensor 45 from the cell outlet temperature Tout sensed by the cell outlet temperature sensor 46, and then determines whether the first subtracting value is higher than or equal to a third predetermined value β. When the central processing unit determines that the first subtracting value is higher than or equal to the third predetermined value β, the central processing unit determines that the cell outlet temperature Tout is increased to be out of the estimated range and proceeds to S38. At S38, the central processing unit determines that the circulation flow volume is in the abnormal state and turns on a second abnormality determining flag.

When the central processing unit determines that the valve opening valve is not fully opened at S34, the central processing unit determines that the cell inlet temperature Tin is in a state that the cell inlet temperature Tin can be adjusted to the proper temperature. In other words, the central processing unit determines that the cell inlet temperature Tin is in the adjusting time period. Then, the central processing unit proceeds to S36. At S36, the central processing unit determines whether the cell outlet temperature Tout is increased to be out of the estimated range in a short time period. Specifically, the central processing unit calculates a second subtracting value by subtracting the target outlet temperature Ttrg calculated by the eighth function block B23 from the cell outlet temperature Tout sensed by the cell outlet temperature sensor 46. Then, the central processing unit determines whether the second subtracting value is in a state where the second subtracting value is higher than or equal to a first predetermined value α1 for a time period longer than or equal to a first predetermined time period t1. In other words, the central processing unit determines whether a state where a divergence of the cell outlet temperature Tout relative to the target outlet temperature Ttrg is higher than or equal to the first predetermined value α1 continues for a time period longer than or equal to the first determined time period t1 in the adjusting time period.

When the central processing unit determines that the cell outlet temperature Tout is increased to be out of the estimated range in the short time period at S36, the central processing unit determines that the circulation flow volume of the refrigerant is in the abnormal state where the circulation flow volume is smaller than the predetermined flow volume and proceeds to S38. At S38, the central processing unit turns on the first abnormality determining flag. When the central processing unit determines that the cell outlet temperature Tout is not increased to be out of the estimated range in the short time period at S36, the central processing unit proceeds to S37. At S37, the central processing unit determines whether the cell outlet temperature Tout is increased to be out of the estimated range for a long time period. Specifically, the central processing unit calculates a third subtracting value by subtracting the target outlet temperature Ttrg form the cell outlet temperature Tout, and then determines whether the third subtracting value is in a state where the third subtracting value is higher than or equal to a second predetermined value α2 for a time period longer than or equal to a second predetermined time period t2. In other words, the central processing unit determines whether a state where the divergence of the cell outlet temperature Tout relative to the target outlet temperature Ttrg is higher than or equal to the second predetermined value α2 continues for a time period longer than or equal to the second determined time period t2 in the adjusting time period.

According to the present embodiment, the second predetermined value α2 is set to be smaller than the first predetermined value α1, and the second predetermined time period t2 is set to be longer than the first predetermined time period t1. When the central processing unit determines that the cell outlet temperature Tout is increased to be out of the estimated range for the long time period at S37, the central processing unit determines that the circulation flow volume of the refrigerant is in the abnormal state where the circulation flow volume is smaller than the predetermined flow volume and proceeds to S38. At S38, the central processing unit turns on the second abnormality determining flag. According to the present embodiment, the first predetermined value $\alpha 1$ and the second predetermined value $\alpha 2$ are set to be smaller than the third predetermined value $\beta$.

The central processing unit executing S36 is equivalent to a determining unit or a first determining unit. The central processing unit executing S37 is equivalent to a second determining unit. In a first determination that is equivalent to S36, when the divergence is higher than or equal to the first predetermined value $\alpha 1$ in the short time period that is the first predetermined time period t1, a possibility that the coolant is leaked from a circulation passage is high and an abnormality is determined. When a damage of the circulation passage is slight and a leaked speed that is a speed of the coolant being leaked is low, the divergence does not become large in the short time period and is small in the long time period. In a second determination that is equivalent to S37, when the divergence is maintained for the second predetermined time period t2 that is the long time period in a case where the divergence is small and is equal to the second predetermined value $\alpha 2$, a possibility that the coolant is leaked while the damage of the circulation passage is slight and the abnormality is determined. When the central processing unit determines that the cell outlet temperature Tout is not increased to be out of the estimated range for the long time period at S37, the central processing unit terminates the second abnormality determining operation shown in FIG. 4 without turning on the second abnormality determining flag.

Figure 6:
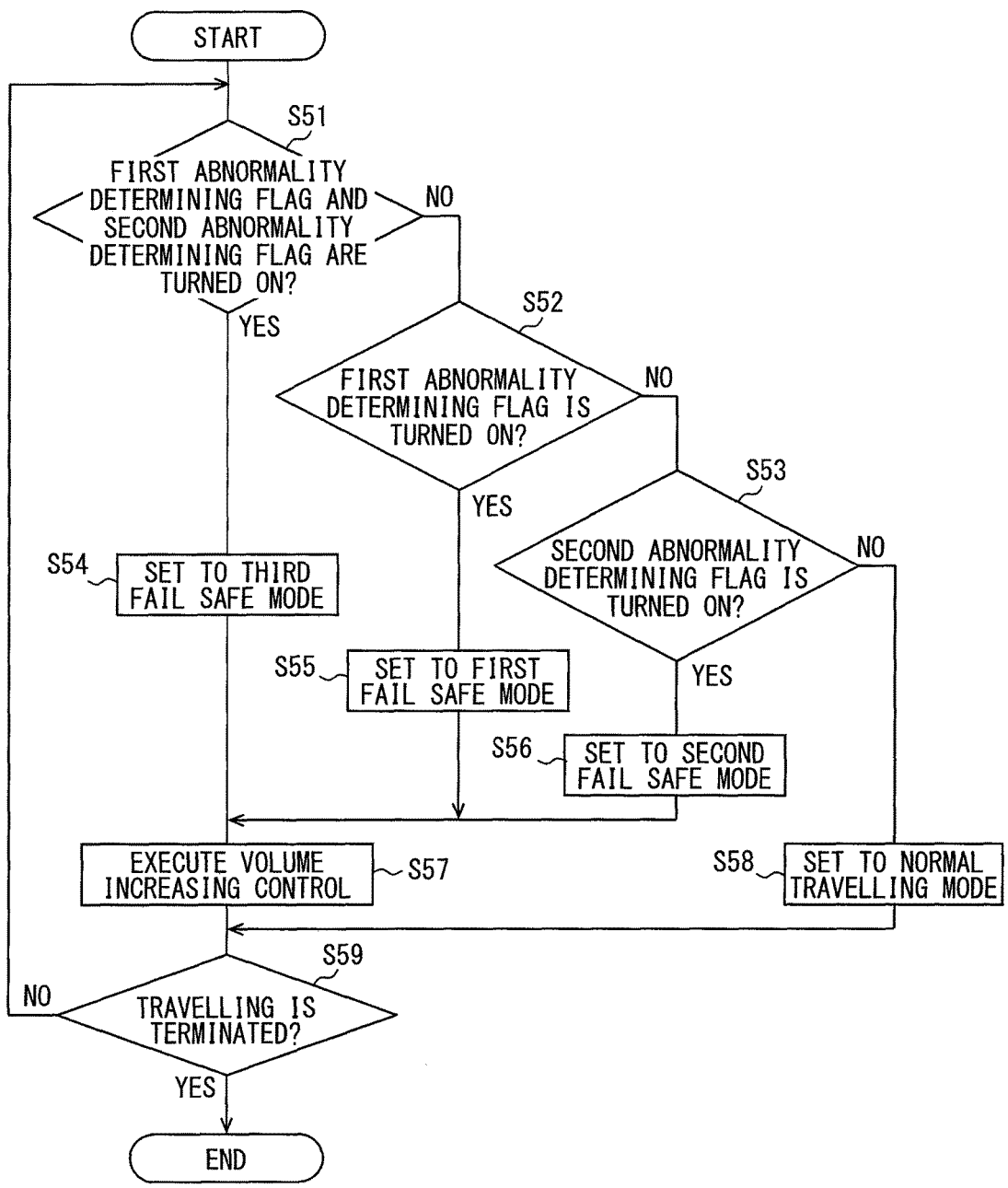
FIG. 6 is a flowchart showing a fail safe control operation executed by the ECU shown in FIG. 1.

At S51 shown in FIG. 6, the central processing unit determines whether the first abnormality determining flag and the second abnormality determining flag are set to be turned on. When the central processing unit determines that the first abnormality determining flag and the second abnormality determining flag are turned on, the central processing unit proceeds to S52. At S52, the central processing unit determines whether the first abnormality determining flag is set to be turned on. When the central processing unit determines that the first abnormality determining flag is not turned on, the central processing unit proceeds to S53. At S53, the central processing unit determines whether the second abnormality determining flag is set to be turned on. When the central processing unit determines that the second abnormality determining flag is not turned on, the central processing unit determines a normal state where a coolant leakage does not occur and proceeds to S58. At S58, the central processing unit sets a mode of the fuel cell hybrid vehicle to the normal travelling mode. When the central processing unit sets the mode of the fuel cell hybrid vehicle to the normal travelling mode, the ECU 17 controls an operation of the fuel cell system 10 without limiting the power generation quantity of the FC stack 11.

When the central processing unit determines that the first abnormality determining flag is set to be turned on at S52, the central processing unit proceeds to S55. At S55, the central processing unit sets the mode of the fuel cell hybrid vehicle to a first fail safe mode. In this case, the ECU 17 controls the operation of the fuel cell system 10 and controls to limit the power generation quantity. When the central processing unit determines that the second abnormality determining flag is set to be turned on at S53, the central processing unit proceeds to S56. At S56, the central processing unit sets the mode of the fuel cell hybrid vehicle to a second fail safe mode. In this case, the ECU 17 controls the operation of the fuel cell system 10 and controls to limit the power generation quantity as the same as that at S55. When the central processing unit determines that the first abnormality determining flag and the second abnormality determining flag are set to be turned on at S51, the central processing unit proceeds to S54. At S54, the central processing unit sets the mode of the fuel cell hybrid vehicle to a third fail safe mode. In this case, the ECU 17 controls the operation of the fuel cell system 10 and controls to limit the power generation quantity as the same as that at S55.

In the above fail safe modes, limiting specifications of the power generation quantities differ from each other. Specifically, in the second fail safe mode, a limitation of the power generation quantity is set to be larger than that in the first fail safe mode, and the FC stack 11 is controlled to generate a slight power. Further, in the third fail safe mode, the limitation of the power generation quantity is set to be larger than that in the second fail safe mode.

The central processing unit executing S55 is equivalent to a first limiting unit, the central processing unit executing S56 is equivalent to a second limiting unit, and the central processing unit executing S54 is equivalent to a third limiting unit.

When the central processing unit sets the mode of the fuel cell hybrid vehicle to one of the above fail safe modes at S54, S55 or S56, the central processing unit proceeds to S57. At S57, the central processing unit executes a volume increasing control to increase a supply power that is the power supplied to the circulation pump 44 and increases the circulation flow volume. The ECU 17 executes the flow-volume regulation to control the circulation flow volume, such that the ECU 17 controls the dryness level of the electrolyte film to be in the optimal range. The central processing unit executing S57 to increase the circulation flow volume is equivalent to a volume increasing control unit.

At S59, the central processing unit determines whether a travelling of the fuel cell hybrid vehicle is terminated. When the central processing unit determines that the full cell hybrid vehicle is travelling, the central processing unit returns to S51. When the central processing unit determines that the travelling of the fuel cell hybrid vehicle is terminated, the central processing unit terminates the present operation that is a fail safe control operation shown in FIG. 6. In other words, operations from S51 to S59 are repeatedly executed in a case where the fuel cell hybrid vehicle is travelling. In addition, when a driver is in the fuel cell hybrid vehicle while the vehicle speed is zero, the power generation of the FC stack 11 is requested. In this case, operations from S51 to S59 may be executed.

Next, referring to FIG. 7, parameters of when the first abnormality determining flag is turned on while the central processing unit determines that the air detection temperature is higher than the air estimation temperature by a value greater than or equal to the predetermined value at S13 in FIG. 2 will be described.

Figure 7:
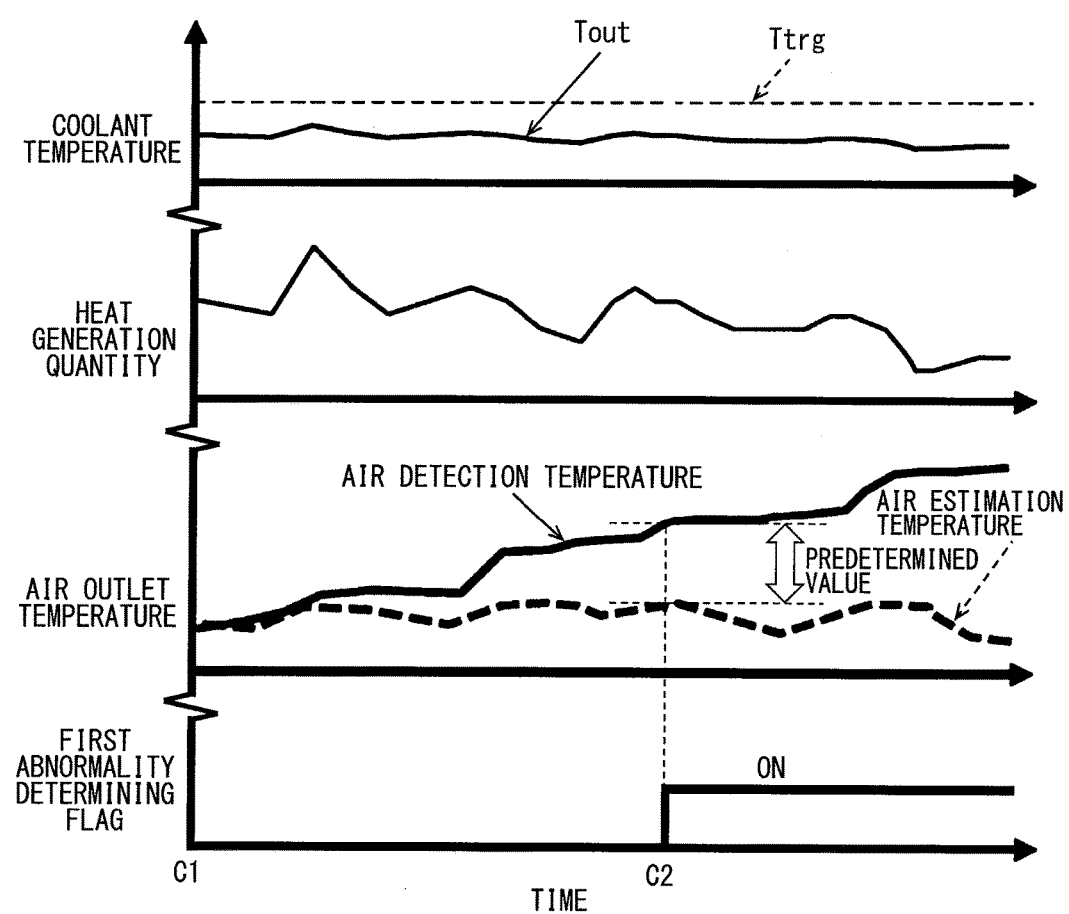
FIG. 7 is a time chart showing parameters of when a first abnormality determination is executed by the first abnormality determining operation shown in FIG. 2.

As shown in FIG. 7, the horizontal axis indicates time and the vertical axis indicates the parameters including a coolant temperature, the heat generation quantity of the FC stack 11, the air outlet temperature and the first abnormality determining flag. The coolant temperature includes the cell outlet temperature Tout indicated by a solid line and the target outlet temperature Ttrg indicated by a dashed line. As shown in FIG. 4, the leakage of the coolant occurs, and the circulation flow volume is smaller than the predetermined flow volume. Further, the circulation pump 44 operates, and the FC stack 11 generates the power.

At a time point C1, the leakage of the coolant occurs, and then the air detection temperature gradually increases. The air parameters and the coolant parameters are stable without changing remarkably, and the air estimation temperature does not increase remarkably. A divergence of the air detection temperature relative to the air estimation temperature increases with time, and the divergence reaches a predetermined temperature at a time point C2. At the time point C2, the central processing unit determines that the air detection temperature is higher than the air estimation temperature by a value greater than or equal to the predetermined value at S13, and the central processing unit turns on the first abnormality determining flag.

At the time point C1, even though the leakage of the coolant occurs, the cell outlet temperature Tout does not exceed the target outlet temperature Ttrg. In this case, the cell outlet temperature sensor 46 does not sense an increasing of the coolant temperature. The inventor of the present disclosure considers the above matter as follows. When the coolant is leaked to be small, only a part of a temperature sensing portion of the cell outlet temperature sensor 46 is in contact with the coolant. When all of the coolant is substantially leaked, the entire of the temperature sensing portion is in contact with the air without being in contact with the coolant. When the outside air temperature is close to the target outlet temperature Ttrg, an erroneous detection that the cell temperature reaches the target cell temperature is executed in a case where the cell temperature is higher than the target cell temperature. When the erroneous detection is executed, the second abnormality determining flag is not turned on while the first abnormality determining flag is turned on.

The inventor considers a case where the second abnormality determining flag is not turned on as follows. Since a heat capacity of the coolant is larger than a heat capacity of the air, the cell temperature increases while the coolant temperature sensed by the cell outlet temperature sensor 46 does not increase immediately in a case where the leakage of the coolant occurs. Since the heat capacity of the air is smaller than the heat capacity of the coolant, the air temperature sensed by the air temperature sensor 24 increases immediately in a case where the leakage of the coolant occurs. Thus, in a short time period from the time point C1 that the leakage occurs, the first abnormality determining flag is turned on, and the second abnormality determining flag is not turned on. In other words, the second abnormality determining flag is turned on when a time period longer than the short time period has elapsed since the time point C1.

Next, referring to FIG. 8, parameters of when the second abnormality determining flag is turned on while the central processing unit determines that the cell outlet temperature Tout is increased to be out of the estimated range for the long time period at S37 will be described.

Figure 8:
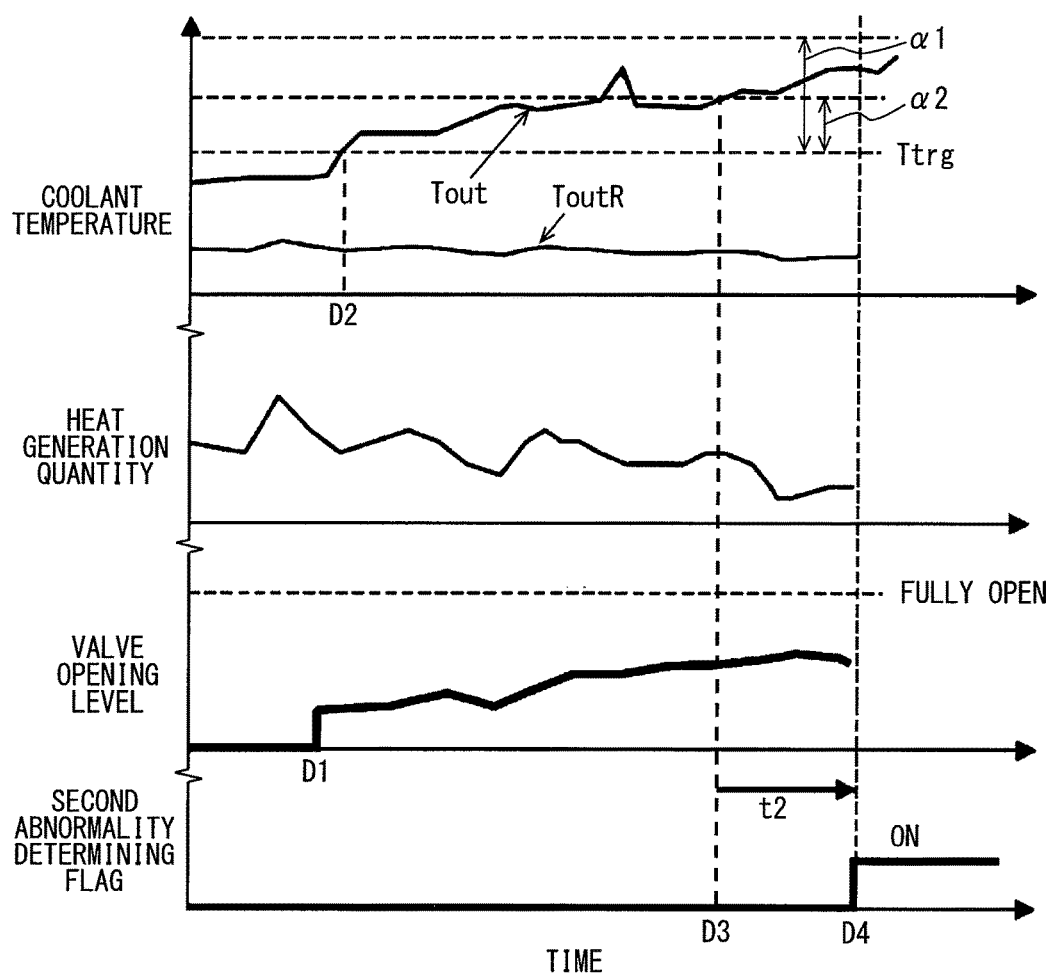
FIG. 8 is a time chart showing parameters of when a second abnormality determination is executed by the second abnormality determining operation shown in FIG. 4.

As shown in FIG. 8, the horizontal axis indicates time and the vertical axis indicates the parameters including the coolant temperature, the heat generation quantity of the FC stack 11, the valve opening level and the second abnormality determining flag. The coolant temperature includes the cell outlet temperature Tout and the radiator outlet temperature ToutR. As shown in FIG. 8, the leakage of the coolant occurs, and the circulation flow volume is smaller than the predetermined flow volume. Further, the adjusting time period where the cell inlet temperature Tin can be adjusted to the proper temperature and the valve opening level is not fully opened is determined.

At a time point D1, a control of the valve opening level starts while the circulation pump 44 is activated. Then, the cell outlet temperature Tout increases due to a shortage of the circulation flow volume. At a time point D2, the cell outlet temperature Tout is higher than the target outlet temperature Ttrg. Since the FC stack 11 is insufficiently cooled down due to the leakage of the coolant when the valve opening level is controlled according to a variation of the heat generation quantity, a state where the cell outlet temperature Tout is higher than the target outlet temperature Ttrg continues. At a time point D3, the cell outlet temperature Tout increases to a value that is a sum of the target outlet temperature Ttrg and the second predetermined value $\alpha 2$. At a time point D4, the central processing unit determines the third subtracting value is in the state where the third subtracting value is higher than or equal to the second predetermined value $\alpha 2$ for a time period longer than or equal to the second predetermined time period t2 at S17, and turns on the second abnormality determining flag.

As the above description, the fuel cell cooling system includes the air temperature estimating unit 17C estimating the air outlet temperature as the air estimation temperature, the air temperature sensor 24 sensing the air outlet temperature as the air detection temperature, and the first abnormality determining unit 17A. When the air detection temperature sensed by the air temperature sensor 24 is higher than the air estimation temperature obtained by the air temperature estimating unit 17C by a value greater than or equal to the predetermined value, the first abnormality determining unit 17A determines that the circulation flow volume is in the abnormal state where the circulation flow volume is smaller than the predetermined flow volume.

The air outlet temperature can be estimated based on the coolant parameters and the air parameters. When the circulation flow volume is in the abnormal state, the circulation flow volume cannot be ensured to match the power supply quantity supplied to the circulation pump 44, and a level of cooling the air at the intercooler 26 is insufficient. Thus, the air detection temperature is higher than the air estimation temperature. According to the present embodiment where the normal state is determined in a case where the air detection temperature is higher than the air estimation temperature by a value greater than or equal to the predetermined value, a liquid collecting unit and a liquid level sensor that are necessary in a cooling system according to JP2002-164070A are unnecessary, and the abnormal state can be detected. Further, the abnormal state can be detected when the leakage occurs at a part of the circulation passage. Further, when the circulation flow volume becomes smaller due to a shortage of a charging quantity of the refrigerant in the circulation passage at a charging operation in a case where the leakage does not occur, the abnormal state can be detected.

According to the present embodiment, the fuel cell cooling system further includes the rotary valve 43 that is the flow-volume ratio regulating valve, the cell outlet temperature sensor 46 that is a refrigerant temperature sensor, the inflow temperature control unit 17D and the second abnormality determining unit 17B, in addition of the first abnormality determining unit 17A. The inflow temperature control unit 17D is configured to control an operation of the rotary valve 43 and adjust the temperature of the refrigerant flowing into the FC stack 11 such that a refrigerant detection temperature that is the temperature sensed by the cell outlet temperature sensor 46 approaches a target refrigerant temperature. The second abnormality determining unit 17B determines whether the circulation flow volume is in the abnormal state based on the refrigerant detection temperature sensed in an adjusting time period that is a time period where the flow-volume ratio of the heat-dissipation flow volume and the bypass flow volume is adjusted without controlling the bypass flow volume to be zero. The adjusting time period is a time period where the flow-volume ratio of the heat-dissipation flow volume and the bypass flow volume is adjusted without controlling the bypass flow volume to be zero. In other words, the adjusting time period is a time period where the valve opening level is not fully opened.

When the heat dissipation quantity of the radiator 42 is sufficient for the heat generation quantity of the FC stack 11, the flow-volume regulation is executed without controlling the bypass flow volume to be zero and the cell outlet temperature Tout is adjusted to be the target outlet Ttrg. When the circulation flow volume of the refrigerant is remarkably small in the adjusting time period where the flow-volume regulation is executed, the cell outlet temperature Tout is higher than the target outlet temperature Ttrg.

According to the present embodiment, the second abnormality determining unit 17B determines whether the circulation flow volume is in the abnormal state, based on the cell outlet temperature Tout sensed in the adjusting time period that is a time period where the temperature regulation is executed without controlling the bypass flow volume to be zero. Thus, it can be detected that the cell outlet temperature Tout becomes remarkably high in the adjusting time period, and the abnormal state can be determined.

According to the present embodiment, the fuel cell cooling system further includes the second abnormality determining unit 17B detecting the abnormal state based on the refrigerant detection temperature in the adjusting time period, in addition of the first abnormality determining unit 17A detecting the abnormal state based on a comparison of the air detection temperature and the air estimation temperature.

As shown in FIG. 7, the first abnormality determining unit 17A detecting the abnormal state based on the air detection temperature can more rapidly detect a leakage abnormality that the circulation flow volume is in the abnormal state than the second abnormality determining unit 17B detecting the abnormal state based on the refrigerant detection temperature does. When the leaked speed of the coolant is remarkably low, the second abnormality determining unit 17B can more accurately detect the leakage abnormality than the first abnormality determining unit 17A does. Thus, according to the present embodiment that the fuel cell cooling system includes the second abnormality determining unit 17B in addition of the first abnormality determining unit 17A, the fuel cell cooling system can rapidly and accurately detect the leakage abnormality.

According to the present embodiment, the fuel cell cooling system further includes the first limiting unit that is equivalent to the central processing unit executing S55 and the second limiting unit that is equivalent to the central processing unit executing S56. The first limiting unit limits the power generation quantity of the FC stack 11 when the first abnormality determining unit 17A determines that the circulation flow volume is in the abnormal state. The second limiting unit limits the power generation quantity of the FC stack 11 when the second abnormality determining unit 17B determines that the circulation flow volume is in the abnormal state. The limiting specifications in the first limiting unit and the second limiting unit are different from each other.

Since the limiting specifications are different in a case where the first abnormality determining unit 17A rapidly detects the leakage abnormality and in a case where the second abnormality determining unit 17B accurately detects the leakage abnormality, the fuel cell cooling system can limit the power generation quantity according to different specifications. Specifically, the first limiting unit more loosely limits the power generation quantity than the second limit unit does, and the first limiting unit slightly limits the power generation quantity. Since the power generation quantity at a level is allowed when the first abnormality determining unit 17A erroneously detects the abnormal state, it can be suppressed that the power generation quantity is limited by the erroneous detection. The second limiting unit more strictly limits the power generation quantity than the first limiting unit, and the second limiting unit remarkably limits the power generation quantity. Thus, a possibility that a damage of the FC stack 11 generated by a cooling insufficiency is prevented can be surely improved.

According to the present embodiment, the fuel cell cooling system further includes the third limiting unit that is equivalent to the central processing unit executing S54, in addition of the first limiting unit and the second limiting unit. The third limiting unit limits the power generation quantity of the FC stack 11 when both the first abnormality determining unit 17A and the second abnormality determining unit 17B determine that the circulation flow volume is in the abnormal state. A level of the limitation of the third limiting unit is set to be larger than a level of the limitation of the first limiting unit and a level of the limitation of the second limiting unit.

When both the first abnormality determining unit 17A and the second abnormality determining unit 17B determine that the circulation flow volume is in the abnormal state, a possibility that an erroneous detection occurs is lower than that in a case where one of the first abnormality determining unit 17A and the second abnormality determining unit 17B determines that the circulation flow volume is in the abnormal state. Thus, according to the present embodiment where the level of the limitation when both the first abnormality determining unit 17A and the second abnormality determining unit 17B determine that the circulation flow volume is in the abnormal state is set to be large, the possibility that the damage of the FC stack 11 generated by the cooling insufficiency is prevented can be surely improved.

According to the present embodiment, the fuel cell cooling system further includes the volume increasing control unit that is equivalent to the central processing unit executing S57 to increase the circulation flow volume of the refrigerant flowing into the FC stack 11 through the circulation passage when the circulation flow volume is determined to be in the abnormal state. Thus, since the circulation flow volume is increased, the divergence between the cell outlet temperature Tout and the target outlet temperature Ttrg remarkably occurs in a case where the circulation flow volume is in the abnormal state. A detecting accuracy of the abnormal state can be improved and the abnormal state can be reconfirmed. Since the circulation flow volume is increased, it can be suppressed that the cell temperature is increased according to the shortage of the circulation flow volume generated due to the refrigerant leakage.

According to the present embodiment, the second abnormality determining unit 17B includes a first determining unit that is equivalent to the central processing unit executing S36. The first determining unit determines that the circulation flow volume is in the abnormal state when a state where the sensed temperature is higher than the target outlet temperature Ttrg by a value that is larger than or equal to the first predetermined value $\alpha 1$ continues for a time period longer than or equal to the first predetermined time period t1 in the adjusting time period.

When the circulation flow volume is close to zero, the cell outlet temperature sensor 46 substantially senses the outside air temperature. Thus, when the outside air temperature becomes lower, the cell outlet temperature Tout sensed in the abnormal state becomes lower. As a result, a control adjusting the cell inlet temperature Tin by adjusting the bypass flow volume without controlling the valve opening level to be fully opened is executed in a case where an actual cell temperature exceeds the optimal range and is high. According to the present embodiment, even when the outside air temperature is low, the determining unit determines that the circulation flow volume is in the abnormal state when a state where the sensed temperature is higher than the target outlet temperature Ttrg by a value that is larger than or equal to the first predetermined value $\alpha 1$ continues for a time period longer than or equal to the first predetermined time period t1 in the adjusting time period. Thus, when the outside air temperature is low, the abnormal state can be detected, and a reliability of a detection of the abnormal state can be improved.

According to the present embodiment, the second abnormality determining unit 17B includes the first determining unit that is equivalent to the central processing unit executing S36 and the second determining unit that is equivalent to the central processing unit executing S37. The first determining unit determines that the circulation flow volume is in the abnormal state when a state where the sensed temperature is higher than the target outlet temperature Ttrg by a value that is larger than or equal to the first predetermined value $\alpha 1$ continues for a time period longer than or equal to the first predetermined time period ti in the adjusting time period. The second determining unit determines that the circulation flow volume is in the abnormal state when a state where the sensed temperature is higher than the target outlet temperature Ttrg by a value that is larger than or equal to the second predetermined value $\alpha 2$ continues for a time period longer than or equal to the second predetermined time period t2 in the adjusting time period. The second predetermined value $\alpha 2$ is set to be smaller than the first predetermined value $\alpha 1$, and the second predetermined time period t2 is set to be longer than the first predetermined time period t1.

When a leaking speed of the refrigerant relative to a leakage abnormality is high, the divergence of the sensed temperature relative to the target outlet temperature Ttrg increases in a short time period. According to the present embodiment, the leaking speed of the refrigerant may be equivalent to the leaked speed of the coolant. When the leaking speed of the refrigerant is low, the divergence is slight and a state where the divergence is slight continues for a long time period. According to the present embodiment, since the first predetermined time period ti is set to be short and the first predetermined value $\alpha 1$ is set to be large in the first determining unit, the first determining unit can rapidly detect the abnormal state in a case where the leaking speed is high. Since the second predetermined time period t2 is set to be long and the second predetermined value $\alpha 2$ is set to be small in the second determining unit, the second determining unit can detect the abnormal state in a case where the leaking speed is low. In this case, when the leaking speed is low, the first determining unit cannot detect the abnormal state.

(Second Embodiment)

According to a second embodiment of the present disclosure, the second determining unit that is equivalent to the central processing unit executing S37 shown in FIG. 4 is replaced by a divergence integrating unit and an integration determining unit. In other words, according to the present embodiment, the second abnormality determining unit 17B includes the divergence integrating unit and the integration determining unit. When a state where the sensed temperature of the cell outlet temperature Tout is higher than the target outlet temperature Ttrg continues in the adjusting time period, the divergence integrating unit integrates the divergence of the sensed temperature relative to the target outlet temperature Ttrg. When the divergence integration value integrated by the divergence integrating unit is higher than or equal to a threshold that is predetermined, the integration determining unit determines that the circulation flow volume is in the abnormal state.

In the fuel cell cooling system according to the present embodiment, since the second abnormality determining unit 17B includes the divergence integrating unit and the integration determining unit, the first determining unit that is equivalent to the central processing unit executing S36 can rapidly detect the abnormal state when the leaked speed of the coolant is high. When the leaked speed of the coolant is low, the integration determining unit can detect the abnormal state while the first determining unit cannot detect the abnormal state.

(Other Embodiment)

The present disclosure is not limited to the embodiments mentioned above, and can be applied to various embodiments within the spirit and scope of the present disclosure. However, the present disclosure is not limited to the above embodiment. The present disclosure can be applied to various embodiments within the spirit and scope of claims of the present disclosure.

According to the first embodiment, at S13 shown in FIG. 2, the fuel cell cooling system turns on the first abnormality determining flag when the air detection temperature is higher than the air estimation temperature by a value greater than or equal to the predetermined value. Alternatively, the fuel cell cooling system may turn on the first abnormality determining flag when a state where the air detection temperature is higher than the air estimation temperature by a value greater than or equal to the predetermined value continues for a time period longer than or equal to a predetermined time period.

According to the first embodiment, the fuel cell cooling system includes the second abnormality determining unit 17B in addition of the first abnormality determining unit 17A. When the fuel cell cooling system includes the first abnormality determining unit 17A, the second abnormality determining unit 17B may be cancelled.

According the first embodiment, the limiting specifications of the first limiting unit and the second limiting unit differ from each other. However, the limiting specifications may be identical to each other. Further, the level of the limitation of the third limiting unit is set to be larger than the level of the limitation of the first limiting unit and the level of the limitation of the second limiting. However, the level of the limitation of the third limiting unit may be set to be smaller than or equal to the level of the limitation of the first limiting unit and may be set to be smaller than or equal to the level of the limitation of the second limiting unit. S51 and S54 shown in FIG. 6 may be cancelled, and the third fail safe mode may be cancelled.

When the fuel cell cooling system controls the valve opening level, the fuel cell cooling system may control a detected value of the cell outlet temperature Tout of the refrigerant to be the target outlet temperature. Alternatively, the fuel cell cooling system may include an inlet temperature sensor sensing the cell inlet temperature Tin of the refrigerant and control a detected value of the cell inlet temperature Tin to be the target inlet temperature.

According to the above embodiments, the adjusting time period is a time period where the flow-volume ratio of the heat-dissipation flow volume and the bypass flow volume is adjusted without controlling the bypass flow volume to be zero. However, the adjusting time period may be a time period where the flow-volume ratio of the heat-dissipation flow volume and the bypass flow volume is adjusted without controlling the bypass flow volume and the heat-dissipation flow volume to be zero.

According to the present disclosure, the radiator outlet temperature sensor 45 shown in FIG. 1 may be cancelled, and the central processing unit may estimate the radiator outlet temperature ToutR based on the outside air temperature. According to the first embodiment shown in FIG. 1, the rotary valve 43 is used as the flow-volume ratio regulating valve. According to the present disclosure, other valves may be used as the flow-volume ratio regulating valve. Further, according to the first embodiment shown in FIG. 1, the rotary valve 43 is a three-way valve that is used as the flow-volume ratio regulating valve. According to the present disclosure, two two-way valves may be combined to constitute the flow-volume ratio regulating valve.

According to the first embodiment, in the circulation passage, the intercooler 26 is connected with the FC stack 11 in a parallel connection. However, the intercooler 26 may be connected with the FC stack 11 in a series connection.

According to the first embodiment, the FC stack 11 is the solid polymer fuel cell. However, the FC stack 11 is not limited, and may be a phosphoric acid fuel cell or a molten carbonate fuel cell. According to the first embodiment, the cooling unit is equivalent to the cooling circuit 16. However, the cooling unit may be other cooling devices.

According to the present disclosure, the ECU 17 may be replaced or achieved by hardware or software or a combination of hardware and software. Further, the ECU 17 may communicate with other control devices that execute at least a part of the above operations. When the ECU 17 is achieved by an electronic circuit, the electronic circuit may be an analog circuit or a digital circuit including plural logic circuits.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fuel cell cooling system circulating a refrigerant in a fuel cell, an air cooler and a radiator by a circulation pump, cooling down the fuel cell by controlling the radiator to dissipate a heat transmitted from the fuel cell to the refrigerant and cooling down an air supplied to the fuel cell by the air cooler, the fuel cell cooling system comprising:
    an air temperature sensor configured to sense an air detection temperature that is a temperature of the air that flows out of the air cooler and is supplied to the fuel cell;
    a computer, including a hardware processor and a non-transitory storage medium storing instructions for execution by the hardware processor such that the computer is at least programmed to:
        estimate an air estimation temperature that is the temperature of the air that flows out of the air cooler and is supplied to the fuel cell, based on a temperature of a refrigerant flowing into the air cooler, a power supply quantity that is a quantity of a power supplied to the circulation pump, a temperature of the air flowing into the air cooler and a flow volume of the air; and
        determine that a circulation flow volume of the refrigerant is in an abnormal state where the circulation flow volume is smaller than a predetermined flow volume when the air detection temperature sensed by the air temperature sensor is higher than the air estimation temperature estimated by the computer by a value greater than or equal to a predetermined value.

2. The fuel cell cooling system according to claim 1, wherein the determination of circulation flow volume of the refrigerant is in the abnormal state is expressed as a first abnormality determination, the fuel cell cooling system further comprising:
    a flow-volume ratio regulating valve configured to adjust a flow-volume ratio of a heat-dissipation flow volume that is a flow volume of the refrigerant flowing into the fuel cell through the radiator and a bypass flow volume that is a flow volume of the refrigerant flowing into the fuel cell by bypassing the radiator;
    a refrigerant temperature sensor configured to sense a refrigerant detection temperature that is a temperature of the refrigerant flowing out of the fuel cell;
    the computer is further programmed to:
        control an operation of the flow-volume ratio regulating valve and adjust the temperature of the refrigerant flowing into the fuel cell such that the refrigerant detection temperature sensed by the refrigerant temperature sensor approaches a target refrigerant temperature; and
        performing a second abnormality determination for determining whether the circulation flow volume is in the abnormal state, based on the refrigerant detection temperature sensed in an adjusting time period that is a time period where the flow-volume ratio is adjusted without controlling the bypass flow volume to be zero.

3. The fuel cell cooling system according to claim 2, wherein the computer is further programmed to:
    perform a first limitation for limiting a power generation quantity of the fuel cell when the first abnormality determination determines that the circulation flow volume is in the abnormal state; and
    perform a second limitation for limiting the power generation quantity of the fuel cell when the second abnormality determination determines that the circulation flow volume is in the abnormal state, wherein
    limit specifications of the first limitation and the second limitation are different from each other.

4. The fuel cell cooling system according to claim 3, wherein the computer is further programmed to:
    perform a third limitation for limiting the power generation quantity of the fuel cell when both the first abnormality determination and the second abnormality determination determine that the circulation flow volume is in the abnormal state, wherein
    a level of a limitation of the third limitation is set to be larger than a level of a limitation of the first limitation and a level of a limitation of the second limitation.

5. The fuel cell cooling system according to claim 1, wherein the computer is further programmed to:
  increase the circulation flow volume of the refrigerant when the first abnormality determination or the second abnormality determination determines that the circulation flow volume is in the abnormal state.

\* \* \* \* \*